United States Patent [19]
Hestich

[11] Patent Number: 4,838,090
[45] Date of Patent: Jun. 13, 1989

[54] MULTICOIL BOURDON TUBE TYPE PRESSURE GAUGE

[75] Inventor: John Hestich, Glendora, Calif.

[73] Assignee: Dwyer Instruments, Inc., Michigan City, Ind.

[21] Appl. No.: 251,339

[22] Filed: Sep. 30, 1988

[51] Int. Cl.⁴ .............................................. G01L 7/04
[52] U.S. Cl. ........................................ 73/738; 73/737; 73/741; 73/742
[58] Field of Search ................. 73/732, 709, 736–738, 73/740–742, 4 R

[56] References Cited
U.S. PATENT DOCUMENTS

| | | | |
|---|---|---|---|
| 1,127,295 | 2/1915 | Shebol et al. | 73/740 |
| 3,375,719 | 4/1968 | Lindsay . | |
| 3,387,495 | 6/1968 | Himstedt | 73/741 |
| 3,805,619 | 4/1974 | Wunderlich . | |
| 3,807,232 | 4/1974 | Wetterhorn | 73/742 |
| 3,815,417 | 6/1974 | Smialowicz | 73/742 |
| 3,911,748 | 10/1975 | Lindsay . | |
| 3,990,309 | 11/1976 | Beckwith et al. | 73/741 |
| 4,449,412 | 5/1984 | Fallon et al. | 73/738 |
| 4,545,256 | 10/1985 | Ferguson | 73/738 |
| 4,646,574 | 3/1987 | Wahl et al. | 73/741 |
| 4,718,279 | 1/1988 | Hestich | 73/734 |

Primary Examiner—Joseph A. Orsino
Assistant Examiner—Brent A. Swarthout
Attorney, Agent, or Firm—Mann, McWilliams, Zummer & Sweeney

[57] ABSTRACT

A multicoil tube type pressure gauge arranged for direct drive of the gauge pointer and for safely handling overpressure in the event of Bourdon tube rupture comprising a casing of round configuration defining a planar upright main chamber, with the casing being indented rearwardly adjacent the axial center of the gauge to define a supplemental chamber, a mounting plate that is common to all the working parts of the gauge secured to the gauge casing over the supplemental chamber and mounting cantilever fashion a tubular spool journaling the gauge pointer shaft, a multicoil Bourdon tube encircling the spool having its sealed end secured to the shaft within the supplemental chamber, and a pressure connection fitting in the form of a connection block anchored to the mounting plate and having a pressure cavity to which the Bourdon tube other end is sealingly secured with its bore in communication with the fitting pressure cavity, with the Bourdon tube direct driving the gauge pointer shaft; the working parts of the gauge being all secured to the mounting plate permits all calibration and zeroing to be accomplished while the working parts are outside of the gauge casing. The gauge is arranged for overpressure safety release rearwardly of the gauge in the event of tube rupture due to overpressure, and has an overpressure stop in the supplemental chamber that prevents "on scale" gauge readings when the gauge is overpressured.

19 Claims, 5 Drawing Sheets

MULTICOIL BOURDON TUBE TYPE PRESSURE GAUGE

BACKGROUND OF THE INVENTION

This invention relates to a pressure gauge, and more particularly, to a pressure gauge for measuring of a gas pressure at a particular pressure source, and employing a coiled Bourdon tube as the pressure sensor.

Pressure gauges equipped with Bourdon tube type pressure sensors are widely used and for a wide variety of applications, and are used in either of the familiar flush mount, turret or surface mount applications. Such gauges are available in a wide variety of Bourdon tube configurations, some requiring gears, linkage, joints, and other moving parts, and some requiring a damping liquid in a hermetically sealed casing. Typically, the casing of these gauges are commonly externally configured for either flush mount or surface mount use, but not both.

SUMMARY OF THE INVENTION

A principal object of the present invention is to provide a Bourdon tube type pressure gauge that is arranged so that the gauge indicator or pointer is directly driven by the Bourdon tube, with the gauge in effect defining a center post construction about which the Bourdon tube is associated in multicoiled relation for both journaling of the gauge indicator shaft and protection of the Bourdon tube coil in the event the gauge is subject to shock or vibration, and with the gauge being arranged so that it can be connected to the pressure source from either the back or underside (or bottom) of the gauge.

Another important object of the invention is to provide a Bourdon tube type pressure gauge that is arranged to both prevent "on scale" readings when the gauge is overpressured, to provide for blow out of the pressure medium from the rear of the instrument should the Bourdon tube rupture from overpressure, and to provide for restriction of blow out from the ruptured Bourdon tube should that happen.

Yet another important object of the invention is to arrange the pressure gauge so that its working parts are assembled on a common mounting plate for effecting all calibration and zeroing that may be required, before such working parts are mounted within the gauge casing, and thus while they remain fully accessible for these purposes outside the gauge casing.

Still another important object of the invention is to provide a Bourdon tube type pressure gauge having a casing or housing arranged for flush mount application, and also provide an optional turret cage in which the same gauge may be removably mounted for effecting surface style mount application of the gauge.

In accordance with the present invention, the gauge casing or housing is of circular configuration that defines a planar main chamber formed in part by a rear or back wall of the casing that has a portion of same indented rearwardly, adjacent the axial center of the gauge, to define a supplemental chamber. A common mounting plate cantilever mounts a tubular spool that is to be substantially aligned with the axial center of the gauge and that journals the gauge pointer shaft, about which spool is disposed a multicoil coil Bourdon tube, with the cantilever spool, the pointer shaft it journals, and the Bourdon tube to be disposed within the gauge casing projecting within the casing supplemental chamber when the gauge is assembled. The mounting plate also has affixed to same a fitting that defines a pressure sensitive cavity and is arranged to be alternately connected to the pressure source from either the rear or underside of the gauge. The fitting is in block or parallelepiped form and is adapted to be slipped through an aperture formed in the casing rear or back wall when the gauge is assembled, with the mounting plate being anchored to the casing rear wall, or back in overlying relation to the supplemental chamber with the Bourdon tube, the gauge pointer shaft, and the indicated spool, extending into the gauge supplemental chamber. The Bourdon tube sealed end is connected to the gauge pointer shaft within the gauge supplemental chamber, and the Bourdon tube open end is sealingly anchored in the fitting block, with the Bourdon tube bore in communication with the fitting pressure cavity through a filter medium. Forward of the mounting plate is the gauge pointer that is secured on the gauge shaft, and the gauge scale plate bearing a zero datum and pressure scale, both of which are disposed in the gauge main chamber that is closed off at the front of the gauge in a sealed off manner by a suitable transparent disc forming a gauge window that is removably held in place by a suitable retaining ring.

The pressure gauge of the invention is arranged so that all working parts of same are secured in assembled relation on the gauge common mounting plate whereby all calibration and zeroing of the gauge working parts can be effected before the gauge working parts are mounted within the gauge, and thus are not then accessible for calibration and zeroing purposes.

The gauge is also arranged for handling overpressure in several different manners. For instance, the rear wall of the gauge of the casing supplemental chamber is apertured and the front of the gauge is in effect leakage-free, for rearward discharge of the pressure medium from the rear of the gauge in the event of tube rupture due to overpressure in use. The Bourdon employed is of small diameter so that it throttles or restricts pressure medium flow therefrom in the event of such rupture, with the fitting filter having a similar effect. The gauge rear wall is formed with an overpressure stop that is disposed in the supplemental chamber, against which the Bourdon tube adjacent its sealed end acts to prevent rotation of the gauge pointer after it has moved beyond full scale due to overpressure.

The gauge casing or housing is configured for flush mount application, with there being provided a turret cage arrangement in which the gauge may be removably mounted that adapts the gauge for surface mount use.

Other objects, uses, and advantages will be obvious or become apparent from a consideration of the following detailed description and the application drawings in which like reference numerals indicate like parts throughout the several views.

However, it is to be distinctly understood that the drawing illustrations referred to are provided primarily to comply with the disclosure requirements of the Patent Laws, and that the invention is susceptible of modification and variations that will be obvious to those skilled in the art, and that are intended to be covered by the appended claims.

DESCRIPTION OF THE PREFERRED EMBODIMENT

Figure 1:
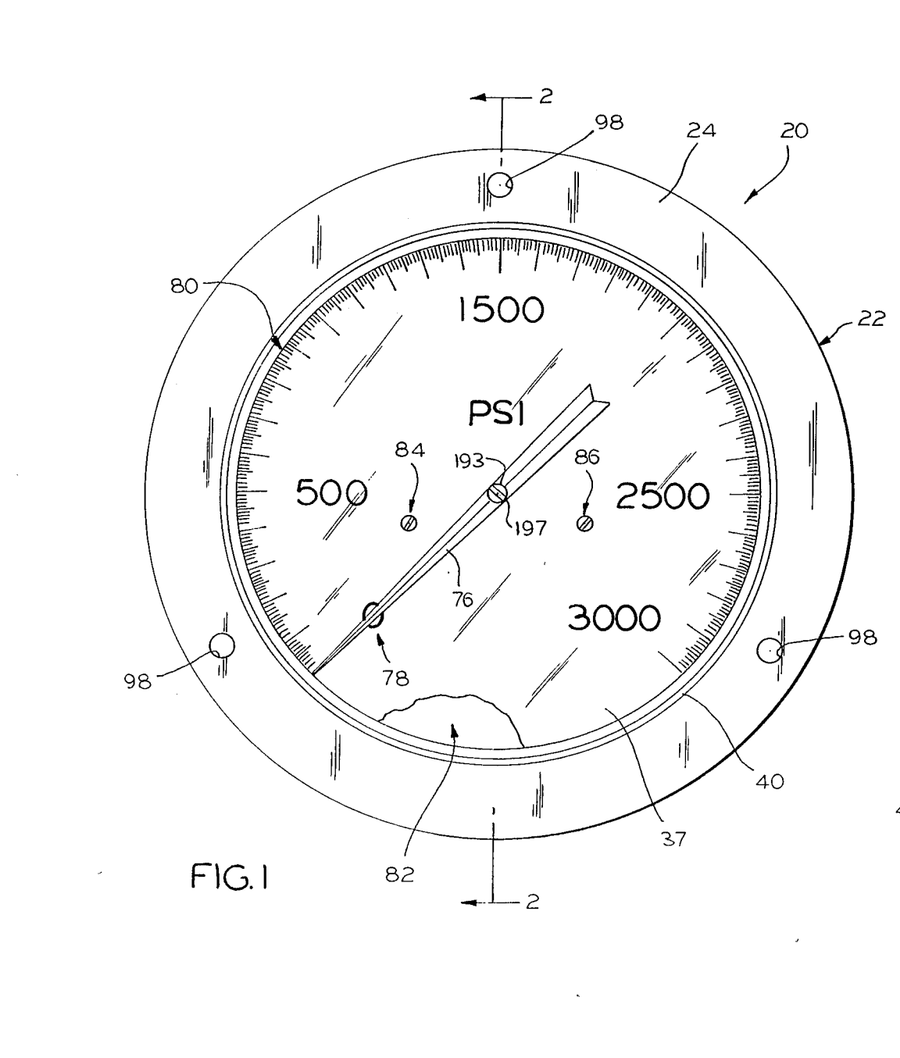
FIG. 1 is a frontal view of a preferred embodiment of the gauge of the present invention, with the gauge lens partially broken away to expose the gauge scale plate.
Figure 2:
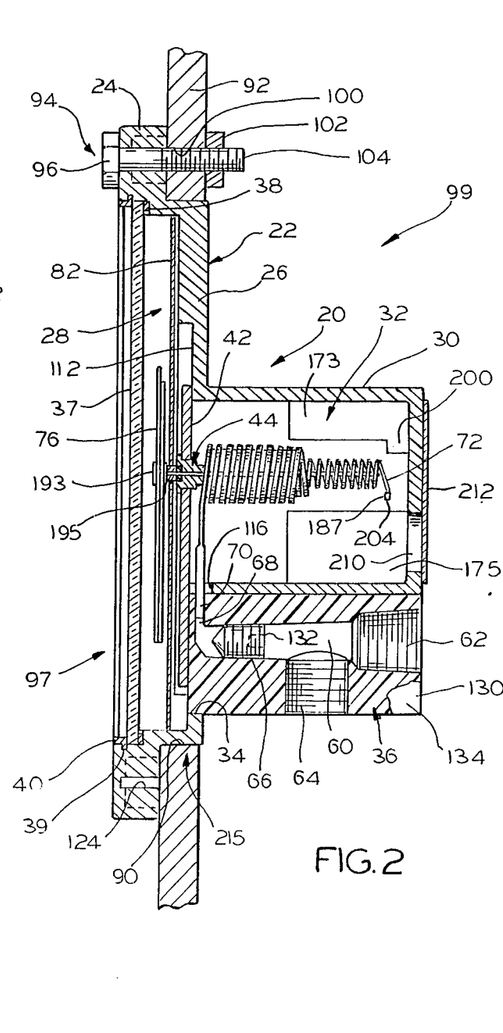
FIG. 2 is a diagrammatic cross-sectional view of the gauge shown in FIG. 1, taken substantially along line 2—2, and showing the gauge in a flush mount application.
Figure 3:
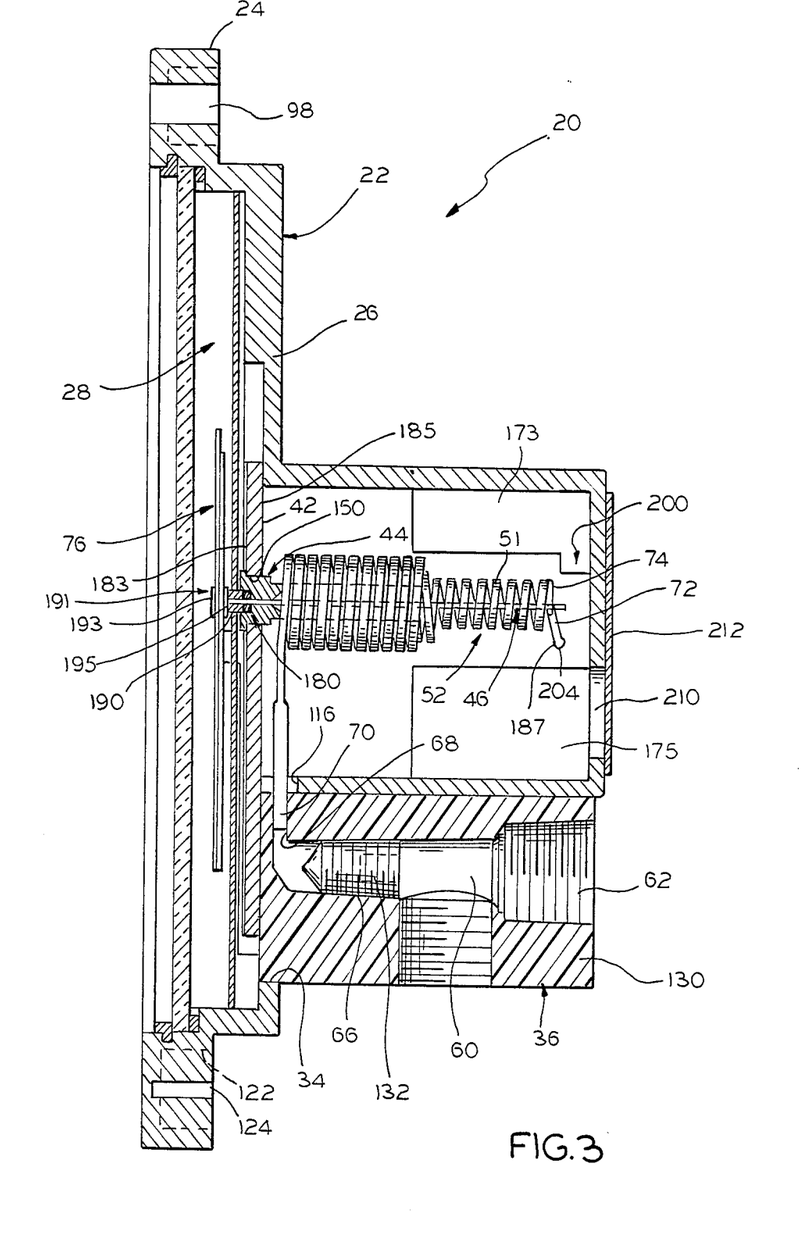
FIG. 3 is a view similar to that of FIG. 2, but illustrating the gauge itself on a larger scale to better illustrate the components involved.

Reference numeral 20 of FIGS. 1–3 indicates a preferred embodiment of the pressure gauge of this invention that comprises casing 22 that is formed from a suitable plastic material, such as mineral filled nylon, to define the forward annular mounting flange 24, the dished casing rear wall 26 that defines the main chamber 28 (of planar contour) of the gauge, and the rearwardly directed indentation 30 of the casing back wall 26 that is of generally parallelepiped configuration and defines a similarly configured supplemental chamber 32. Below the casing rear wall indentation the rear wall is apertured as at 34 to receive a double purpose connection fitting 36 that is of parallelepiped or block configuration in exterior outline, as will be explained hereinafter.

The casing 22 at the front of the instrument (the side of the instrument viewed in FIG. 1) is suitably formed to sealingly mount transparent disc 37 against suitable annular sealing O-ring 38, and that is held in place by conventional locking type retaining ring 40 that snap fits against disc 37 and into annular groove 39 of casing 22.

Figure 4:
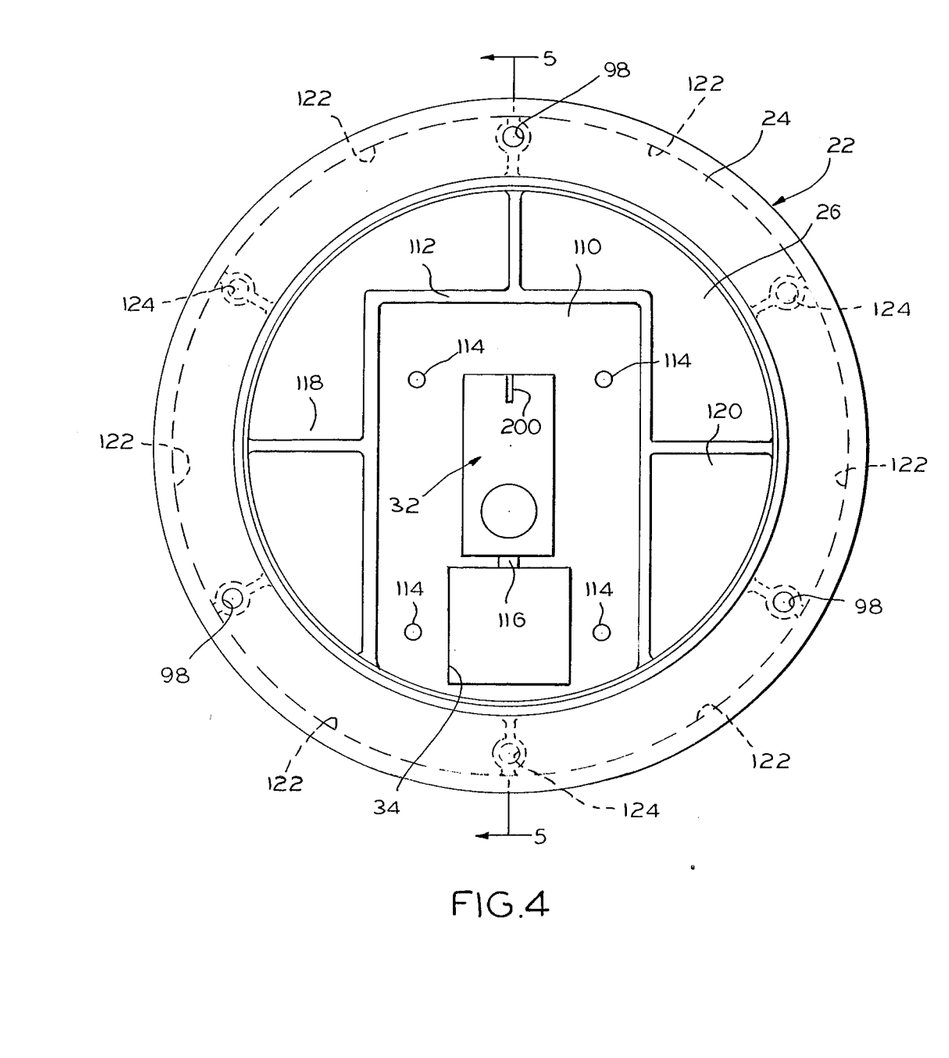
FIG. 4 is a front or inside elevational view of the gauge casing.

The gauge 20 also comprises a mounting plate 42 that is appropriately secured to the casing back wall 26 across supplemental chamber 32, as by employing suitable self threading screws or the like (not shown) for this purpose, and applied to the casing apertures 114 (see FIG. 4). A basic feature of the present invention is that the mounting plate 42 is a common mount for all the working parts of the gauge, so that the gauge working parts can be calibrated and zeroed as needed prior to the time that the mounting plate and associated gauge working parts are mounted within the casing 22, and thus become largely inaccessible without taking the gauge 20 apart.

Figure 7:
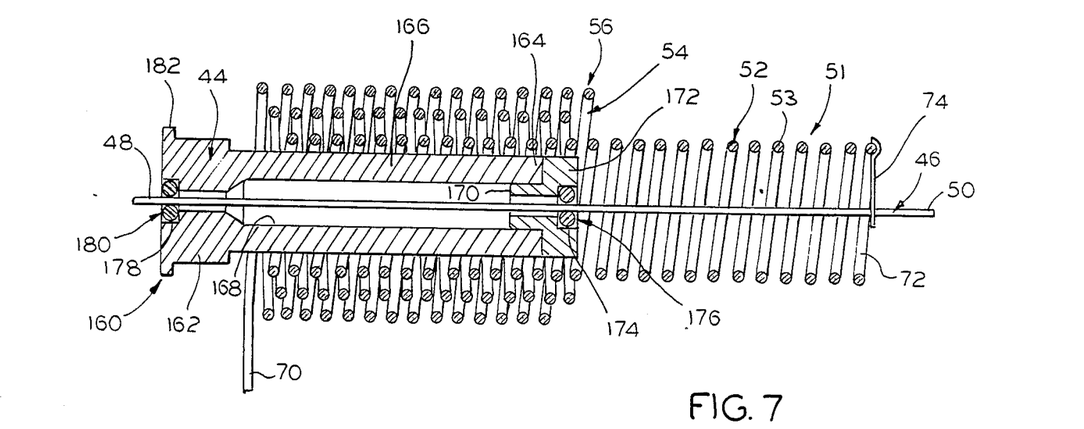
FIG. 7 is an enlarged vertical sectional view through the gauge Bourdon tube, tubular spool, and the gauge indicator shaft that the spool journals, illustrating several details of construction.
Figure 8:
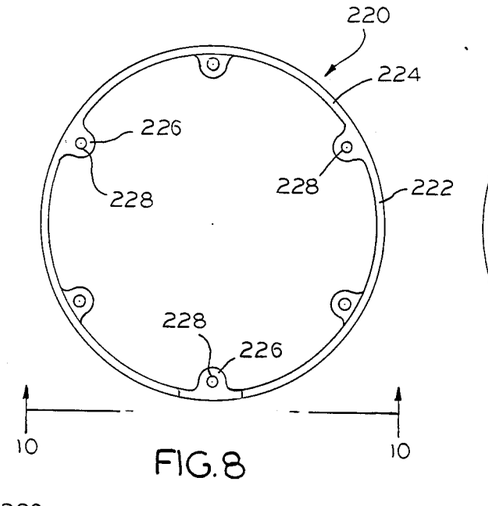
FIG. 8 is a front elevational view of a turret cage for mounting the gauge of FIGS. 1–7 surface mount style.
Figure 9:
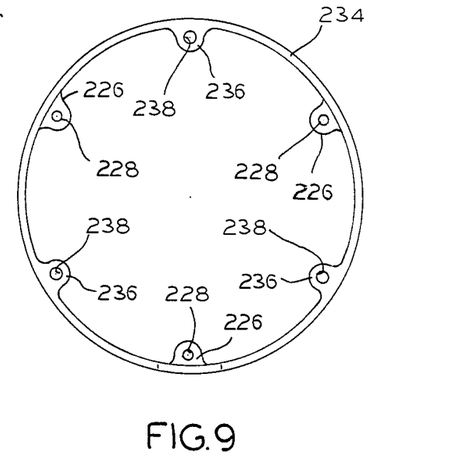
FIG. 9 is a rear view of the mounting cage shown in FIG. 8.

The working parts of the gauge 20 comprise tubular mounting spool 44 (see FIG. 7) in which the gauge pointer shaft 46 is journaled so as to dispose its front end 48 within the gauge main chamber 28, and its rear end 50 well within the supplemental chamber 32. Received about the spool 44 is the multicoil coil Bourdon tube 51 of the gauge (see FIG. 7), which in the form shown has the usual bore (not shown to simplify the drawing) and comprises an elongate first or innermost coil 52, a shorter center coil portion 54, and an outer coil portion 56 that overlies the coil center portion 54, as shown in FIG. 7. The connector fitting 36 is affixed to the mounting plate 42 by screws or the like, and is formed to define pressure cavity 60 that is open to the suitable threaded connection openings or sockets 62 and 64 that in accordance with the invention provide alternate ways of connecting the Bourdon tube 51, using a conventional fluid connector, to the source of pressure, through a suitable externally threaded filter body 66 that is permanently mounted within the fitting 36, as will be hereinafter described.

The fitting 36 is apertured at 68 (see FIGS. 2 and 3) to receive the end 70 of the Bourdon tube 51 in sealed relation thereto (as by employing suitable brazing techniques), while the end 72 of the Bourdon tube 51 is anchored to the end 50 of the indicator shaft 46 (see FIG. 7) by employing metallic connector arm 74 and suitable bonding techniques, such as brazing, to bond the arm 74 to the shaft 46 and the tube end 72 in the manner suggested in FIG. 7.

Adjustably mounted on the end 48 of the shaft 46 is the gauge pointer 76 such that, when the instrument 20 is calibrated at zero, it is aligned with the zero datum indicated by reference numeral 78 (see FIG. 1) that forms a part of the pressure scale 80 which may be in any convenient scale (pounds per square inch is the scale illustrated) for measuring the pressure of a source that is connected to the Bourdon tube 51, and thus effects deflection of the Bourdon tube in proportion to the pressure sensed thereby, in accordance with standard Bourdon tube technology. The zero datum 78 and scale 80 are applied to a suitable scale plate 82 that is also suitably mounted on mounting plate 42, as by employing suitable self threading screws 84 and 86 shown in FIG. 1, and suitable annular spacers through which said screws pass, into suitable openings formed in mounting plate 42, that are imposed between the scale plate 82 and the mounting plate 42 to space the scale plate 82 from the mounting plate 42.

The gauge casing 22 is arranged for flush mounting, as shown in FIG. 2, in a suitable aperture 90 formed in, for instance, an upright board 92 that is suitably supported in upright position at the location where the site of the gauge 20 is desired, as by employing suitable nut and bolt devices 94 that are diagrammatically illustrated in FIG. 2, involving the bolts 96 applied to the respective apertures 98 of the casing flange 24, and congruently located apertures 100 formed in the upright board 92, with suitable nuts 102 being applied to the shanks 104 of the respective bolts 96 to hold the gauge 20 in mounted relation, and with the front face 97 of same facing to the left of FIG. 2 and the rear 99 of the gauge 20 facing to the right of FIG. 2.

THE INSTRUMENT CASING

Figures 4A, 5:
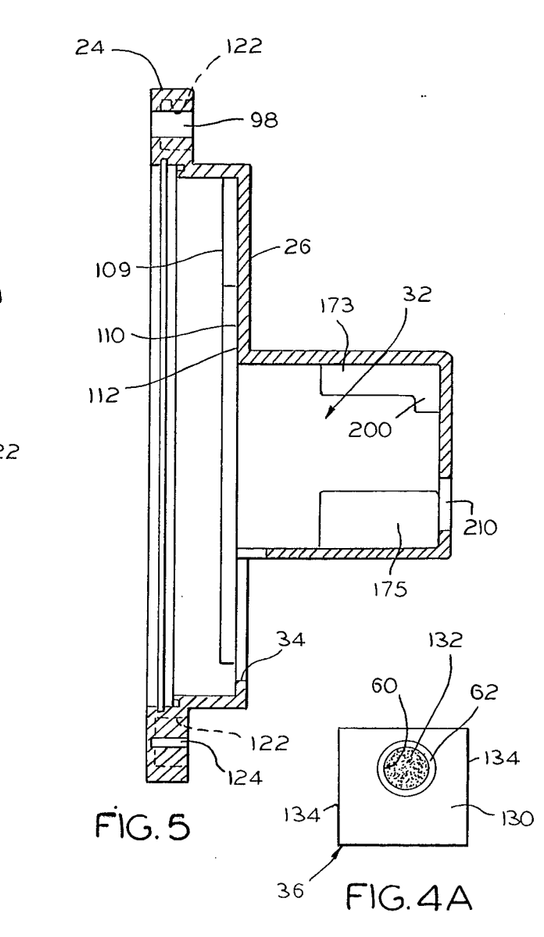
FIG. 4A is a rear elevational view of the gauge connector fitting.
FIG. 5 is a vertical sectional view taken through the gauge casing, substantially along line 5—5 of FIG. 4.
Figure 6:
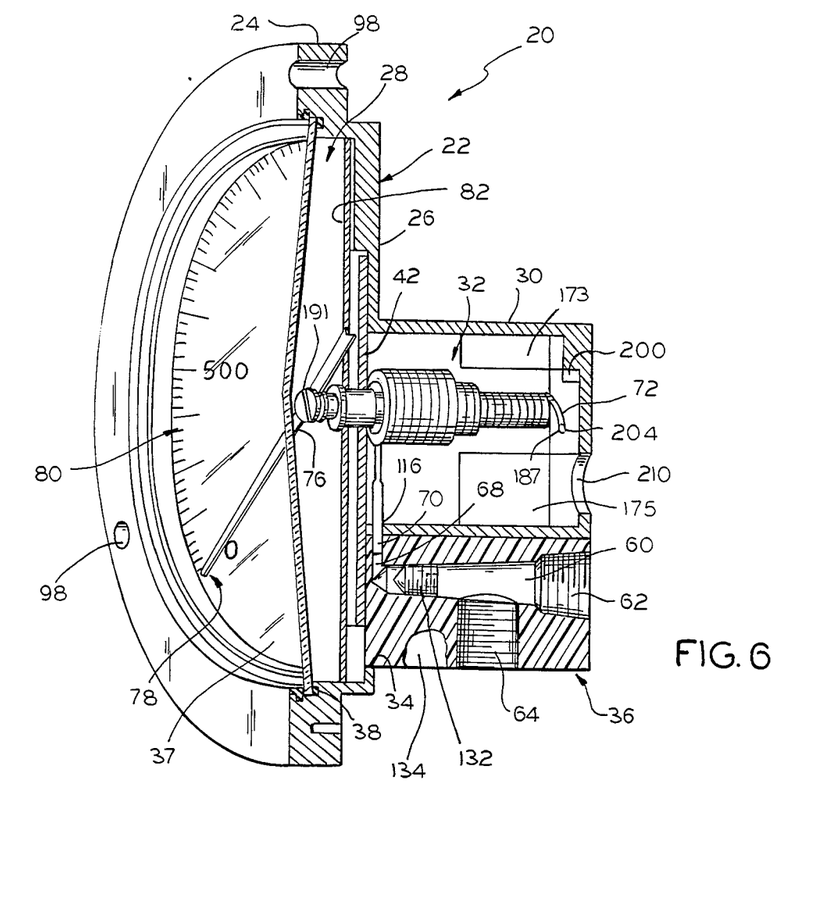
FIG. 6 is a diagrammatic perspective view of the gauge, partially in section, and showing the gauge substantially as it appears in FIGS. 1 and 2.

FIGS. 4 and 5 diagrammatically illustrate the instrument casing 22, from which it can be seen that the casing rear wall 26 on its inner side 109 is recessed or indented as at 110 sufficiently to define a generally quadrilateral land 112 against which mounting plate 42 is applied, as by applying suitable screws (not shown) through same into the respective apertures 114. The land 112 opens into subchamber 32 marginally thereabout, except at indentation 116 which is formed to accept the end 70 of the Bourdon tube 51 that is to extend into the fitting 36. The land 112 also defines the quadrilaterally configured aperture 34 that is to receive the fitting 36 in underlying relation to the rearward indentation 30 of the casing 22 when the mounting plate 42 is to be secured in place.

Figures 10, 11:
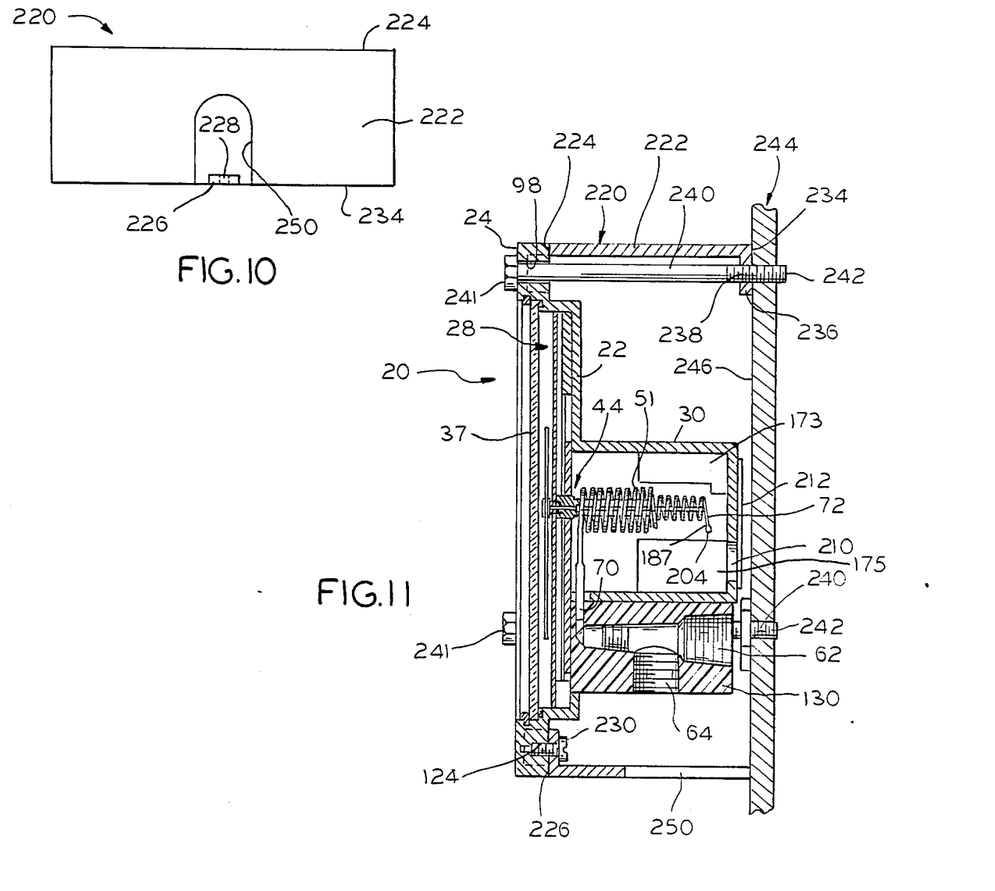
FIG. 10 is a bottom view of the mounting cage shown in FIG. 8.
FIG. 11 is a vertical sectional view showing the gauge of FIGS. 1–7 mounted in the turret cage of FIGS. 8–9 in a surface mount application.

The indentation 110 also includes the oppositely disposed rectilinear ribs 118 and 120 that are primarily for material saving purposes, and, of course, the casing 22 may be otherwise recessed as may be considered necessary or desirable, for instance, to form the curvilinear grooves 122 that are on the back side of the casing mounting flange 24 between the portions of the casing flange 24 that define the apertures 98 that are at the front of the casing 22 and apertures 124 that are open only at the back or rear of the casing 22 (see FIGS. 4, 5 and 11); function of apertures 124 is described hereinafter in connection with the showing of FIG. 11.

THE GAUGE CONNECTION TO THE SOURCE OF PRESSURE

The connection of the gauge 20 to the source of pressure is by way of the connection fitting 36, which in the form illustrated comprises a block or body 130 formed from brass or the like to define the suitable threaded sockets 62 and 64 that communicate with the fitting pressure cavity 60 that in the form illustrated, may be round in configuration, concentric with the socket 62, and suitably internally threaded to receive the filter body 66, which preferably is in the form of a conventional plug 132 formed of sintered metal and is externally threaded for threaded application to the fitting body 130 to the position indicated in FIGS. 2 and 3. Body 130 also has opening 68 formed therein to receive the end 70 of the Bourdon tube 51.

It will be apparent that suitable conventional machining processing can be effected on the body 130 to form the sockets 62 and 64, the pressure cavity 60 and its internal threading, and the opening 68.

As indicated, the body 130 is to be anchored to the mounting plate 42 by employing suitable screws, or some other fastening means (not shown), after the end 70 of the Bourdon tube 51 has been applied thereto to expose its bore 53 to the pressure cavity 60 through the filter body 66.

It is here pointed out that the sockets 62 and 64 permit connection of the gauge 20 to the source of pressure from either the rear or bottom of the gauge 20, using the usual flexible tubular connector equipped with the familiar end fittings for this purpose, with the sockets 62 or 64 not being used being closed by a conventional socket closure plug that may be in the familiar form that is equipped with a square or hex shaped outer lug for turning purposes. As the block or body 130 is to be parallelepiped in exterior shape, and be proportioned to have its sides closely received by the casing quadrilateral aperture 34, it has flat sides 134 that serve as wrench flats that aid in connecting tubular connections to the body 130 (see FIG. 4A).

THE MOUNTING PLATE

The mounting plate 42 is preferably of flat quadrilateral configuration appropriate for fitting into the recess 110 in overlying relation to the subchamber 32, it being formed with appropriate screw or the like receiving openings that are congruent with the casing openings 114 for securement thereagainst. The back plate 42 is also formed with aperture 150 (see FIG. 3) that is to mount the spool 44 cantilever fashion as hereinafter described.

THE GAUGE SPOOL AND POINTER SHAFT JOURNALED THEREBY

The journaling of the pointer shaft 46 of the gauge 20 is best diagrammatically illustrated in FIG. 7, which also diagrammatically illustrates the specifics of the journaling tubular spool 44 of this invention. The shaft 46 and spool 44 are coaxially related, and are located approximately at the axial center of the gauge 20 as it is viewed in FIG. 1. The spool 44 thus forms what may be designated as a center post 160 for gauge 20 that forms a support both for the pointer shaft 46 it journals and the gauge pointer 76 that is actuated by the deflection of tube 51 acting on shaft 46, in proportion to the pressure of the pressure medium having access to the bore 53 of Bourdon tube 51 by way of the connection block 130 to which the open end 70 of the Bourdon tube is connected and the indicated conventional tubular connector that is connected between block 130 and the pressure source (in use).

As indicated in FIG. 7, the spool 44 comprises a head end 162 and a rear or back end 164 that is part of an elongate spool shank 166. The spool 44 is formed with a suitable bore 168 that extends therethrough, and that is enlarged through shank 166 and its end 164 for reception therein of the shank 170 of spool end plug 172, with the relation between the plug shank 170 and the spool bore 168 being of a friction fit type. The plug 172 is recessed or counterbored as at 174 to receive a conventional round doughnut type jeweled bearing diagrammatically illustrated at 176, which forms one of the journals for pointer shaft 46. The spool end 162 is similarly recessed or counterbored at 178 for reception of the same type of bearing diagrammatically indicated by reference numeral 180 for forming the other of the two points of journaling for the pointer shaft 46.

The spool head 162 is externally proportioned for friction fitting within the rounded aperture 150 of mounting plate 42, and is formed with annular end flange 182 that serves as the stop to limit the amount that the spool 44 projects outwardly of the mounting plate 42 cantilever fashion. The spool 44 is applied to mounting plate 42 by being pressed into same so as to bring end flange 182 flush against the front side 183 of mounting plate 42. Spool 44 thus projects from the rear side 185 of mounting plate 42 when these two parts are assembled.

The Bourdon tube 51 may be of any conventional type, it, of course, being formed from material suited for that purpose, such as Beryllium copper tubing, or tubing formed from other material such as Inconel, phosphur bronze, or stainless steel. In one practical embodiment, the tube 51 is formed from Beryllium copper tubing of 0.040 inch outer diameter and 0.005 inch wall thickness, while the Bourdon tube 51 should have a relatively small diameter bore, the wall thickness of the Bourdon 51 can be varied as desired for providing capability of handling pressures up to 5,000 psi or more.

As already indicated, the specific Bourdon tube 51 of the gauge 20 is of the multicoil type comprising inner coil 52, middle coil 54, and outer coil 56, which are formed in any suitable and convenient manner that is well known to this art. The tube 51 is continuous between its ends 70 and 72, with the terminous of end 72 being suitably brazed or the like (as at 187, see FIG. 3) to close off the bore 53 at the tube end 72. Bracket 74 is brazed in place between the last convolution of the tube coil 52 and the shaft 46, and the end 70 of the tube 51 is brazed in place within the opening 68 of connection block 130, but with the bore 53 of the tube 51 open to the pressure cavity 60 through filter body 66.

As will be clear from the showing of FIG. 7, the inner coil 52 of the tube 51 is in closely spaced relation to the shank 166 of spool 44, with the Bourdon tube outer coils 54 and 56 being in turn supported by the tube inner coil 52. The center post arrangement 160 in the form of spool 44 thus maintains the tube 51 substantially centered with respect thereto against shock or vibration that the gauge may be exposed to.

It will be apparent that other forms of Bourdon tubes may be employed but mounted as hereindisclosed, such as Bourdon tubes of the T-shape that are illustrated in U.S. Pat. Nos. 3,805,619 and 3,911,748, it being understood that the size and depth of supplement chamber 32 is to be varied as needed to freely accept the Bourdon tube employed.

The Bourdon tube 51 is further protected against shock on vibration by spaced coplanar keys 173 and 175 that are also coplanar with the pointer shaft 46. Keys 173 and 175 are shown in FIGS. 2-5, 6 and 11.

THE GAUGE SCALE PLATE, INDICATOR, AND APPLICATION OF THE LATTER TO THE GAUGE INDICATOR SHAFT

As indicated in FIG. 3, forwardly of the journaling bearing 180, a sleeve 190, formed from nylon or the like, is applied to shaft 46 from scale plate 82, for free spacing the indicator shaft 46 for rotational movement relative to scale plate 82.

The pointer 76 may be of any suitable type currently used in this art as an indicator for pressure, and is secured to the shaft 46 by any suitable conventional friction gripping washer device that permits the pointer 76 to be adjusted relative to the shaft 46 in the event of overpressure conditions that deform the coils defined by tube 51 to effect rezeroing after overpressure, the transparent disc 37 being removed from the gauge 20 for this purpose. For this purpose the pointer 76 has discs 193 and 195 on either side of same that are suitably crimped against the pointer 76 and, for instance, a Bellville spring (not shown), underlying either one of the discs 193 or 195 and bearing against the pointer 76, to form a connector device 191 which fixes discs 193 and 195 to the shaft 46 with the pointer being frictionally but adjustably held to the shaft by the compression acting on it and the Bellville spring. In the form illustrated, the washer 193 is formed with a screw driver receiving slot 197 when this adjustment is to be made (as discussed hereinafter).

OVERPRESSURE PROTECTION PROVIDED BY GAUGE

As it is always possible that pressure gauges, particularly those that are to be subjected to the higher pressure ranges, may be overpressured for one reason or another, the gauge 20 is equipped to handle overpressure, safely and effectively.

Should the gauge 20 be subjected to overpressure not sufficient to rupture the tube, the gauge casing 22 projection 30 is formed with an overpressure stop flange 200 (see FIGS. 2-5) that may be integral and coplanar with key 173, and the tube end 72 cooperates with flange 200 to prevent "on scale" readings of the gauge 20 when the gauge 20 is overpressured (without rupturing tube 51) and its indicator 76 is off scale. For this purpose, the flange 200 is in the casing supplemental chamber 32 and the inner coil 52 of tube 51 is disposed cantilever fashion sufficiently within the supplemental chamber 32 so that the tube closed terminous 187 is in substantial coplanar relation with the stop 200. The arrangement is such that in the event of the gauge 20 being subjected to overpressure, the tube end 72 can move approximately 15 degrees past the maximum scale position of the gauge 20 (3,000 pounds in the embodiment shown in FIG. 1) clockwise to bring the tip 204 of the tube end terminous 187 (of tube end 72) into engagement with stop flange 200, so that the indicator when overpressure is experienced will not pass the zero datum 78.

The gauge 20 also has provision in the event that the tube 51 should rupture due to overpressure in use. For this purpose, the casing indentation 30 is formed with aperture 210 that provides for rearward discharge of the pressure medium that is flowing into the subchamber 32 as a result of the indicated tube rupture. This aperture 210 is conveniently closed in the illustrated embodiment by applying a suitable gauge identification sticker 212 to the projection 30 in overlying relationship to the aperture 210 to appropriately mask same. The sticker 212 may be in the form of any adhesive backed paper or plastic that is frangible and perforates when excessive pressures are experienced within the supplemental chamber 32. For this reason, the gauge main chamber 28 is sealed off by the plate 42 to provide a solid front across the front of subchamber 32, thus avoiding overpressure and possible forward failure of disc 37 in gauge 20.

It will also be apparent that since the bore of the tube 51 is of small dimension in diameter, the Bourdon tube itself throttles or restricts any flow of the pressure medium resulting from the rupture of the tube 51 from overpressure. The filter plug 66 has a similar action.

MANNER OF MOUNTING THE GAUGE

FIG. 2 of the drawings illustrates the gauge 20 as employed in a flush mount, whereby the fastening devices 94 or their equivalents are employed to secure the anchoring rim 24 of the gauge casing 22 to upright board or the like member 92, with the body 215 of the gauge being disposed within an appropriate opening 90 formed in such upright member 92. The socket 64 permits either a turret mount or stem mount of gauge 20, if so desired.

FIGS. 8-11 illustrate a gauge mounting turret cage or ring 220 that may be employed to mount the gauge 20 in a surface mount position.

The turret cage 220 comprises an annular side wall 222 having on the front side 224 three fingers 226 that are each apertured as at 228 to receive cage mounting self tapping screws 230 that are applied to the respective openings 124 of the gauge casing end flange 24, one of which is shown in FIG. 11. The side wall 222 at its rear side 234 is formed with three equally spaced fingers 236, each having an aperture 238, to receive the shanks 240 of the respective bolts 241 that are applied to the gauge casing mounting flange apertures 98, in the manner indicated in FIG. 11, with the threaded portion 242 of the shanks 240 being applied to a suitable mounting board or other upright structure indicated at 244.

It will be noted in this connection that the surface mounting arrangement for gauge 20 that is shown in FIG. 11 not only disposes the cage side wall 222 in turret masking relation about the gauge 20 between the mounting board surface 246 and the gauge flange 24, but also spaces the gauge 20 from the surface 246 of the mounting board 244 (or other upright member involved) so that in the event of rupture of the gauge tube 51 due to overpressure, the overpressure will discharge from the rear of the gauge in a manner similar to that hereinbefore described.

The turret cage 220 at its bottom is also formed with U-shaped aperture 250 to provide for a bottom connection to the gauge 20, as well as also to accommodate venting of overpressure blow out from the gauge.

It will therefore be seen that the gauge of the present invention provides a number of significant features.

Thus, the gauge itself is arranged for overpressure blow out from the rear of the gauge in the event of rupture of the Bourdon tube due to overpressure, the front of the gauge being leakage-free and sealed and solid thereacross. The fluid aperture 210 that is formed in the casing indentation 30, which is lightly sealed in use, is provided for the purpose of permitting this rearwardly directed overpressure blow off.

The Bourdon tube 31 of gauge 20 is arranged with respect to its indicator shaft 46 to provide a direct drive for such shaft and the indicator 76, with gearing, linkages, etc., being unnecessary, and the indicator shaft 46 being journaled for rotation by two separate bearings that result in great resistance to wear, and great resistance to wear and damage from vibration and pulsations in the pressure medium, which makes for a long useful life of the gauge 20.

The gauge center post arrangement 160 provided by the spool 44 not only effects journaling of the indicator shaft at two locations, but also protects the Bourdon tube itself from damage due to shock or vibration.

The arrangement of the pointer shaft journaling spool 44 is such that it is friction fitted or pressed into the mounting plate 42, and the spool is trapped in place by the installation of the gauge scale plate 82.

The gauge internal overpressure stop arrangement involving overpressure stop 200 and the tube terminous 204 prevents "on scale" readings when the gauge 20 is overpressured and reads out of scale.

The gauge connection block 130 is formed with sockets 62 and 64 for back or bottom connection of the source of pressure to the gauge so that the gauge is a universal model. The flat sides 134 of the connection block 130 provide wrench flats that aid in connecting the usual tubular connectors to the connection block 130.

As indicated, the gauge 20 can be rezeroed after it has been overpressured enough to deform the coils of tube 51 by removing the disc 37, suitably holding the shaft against movement, and rotating the pointer 76 on the shaft 46 as necessary to reset the indicator on the zero datum 78. In the embodiment that is illustrated, the disc 193 of the connector device 191, for securing the pointer 76 to the shaft 46 is slotted as at 197 for forming a screw driver slot for this purpose; as the discs 193 and 195 are fixed to shaft 46, and pointer 76 is only frictionally held with respect to shaft 46, by holding shaft 46 stationary using slot 197 of disc 193 and a suitable screw driver (not shown), the pointer 76 can readily be shifted relative to shaft 46 to reset the pointer 76 on the zero datum 78.

The gauge 20 is arranged so that all its working parts are assembled onto common mounting plate 42 so that all calibration and zeroing can be accomplished before the gauge working parts are mounted in case 22, where they would then be largely inaccessible. The mounting plate 42 as mounted in its operative position also essentially seals off the supplemental chamber 32 from the main chamber 28.

Where a surface mount arrangement is desired for the gauge 20, the mounting turret cage 220 may be employed in the manner indicated in FIG. 11.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A Bourdon tube type pressure gauge comprising:
   a casing defining a relatively planar main chamber,
   said casing being indented rearwardly to define a supplemental chamber,
   a mounting plate secured to said casing over said supplemental chamber and within said main chamber, with one side of said mounting plate facing said supplemental chamber,
   a tubular spool cantilever mounted on said mounting plate adjacent one end of same and extending through said mounting plate and into said supplemental chamber,
   a rectilinear shaft journaled in said spool and having one end of same disposed in said main chamber and the other end of same projecting from said spool within said supplemental chamber,
   a multicoil Bourdon tube defining a bore extending the length thereof and encircling said spool,
   with one end of said tube being sealed,
   said tube being fixed to said shaft, adjacent said other end of said shaft, and adjacent said tube one end,
   fitting means anchored to said mounting plate and including a gas pressure cavity,
   means for connecting said pressure cavity to a source of pressure fluid,
   with the other end of said tube being anchored to said fitting means with said tube bore exposed to said cavity,
   a scale plate, including a zero datum, fixed to said mounting plate on the side of said mounting plate facing away from said supplemental chamber with said shaft one end extending through said scale plate,
   said one end of said shaft mounting an indicator,
   and means for setting said indicator on said zero datum, said scale plate forming the face of said gauge.

2. The pressure gauge set forth in claim 1 wherein:
said casing and said main chamber are of essentially concentric round configuration.

3. The pressure gauge set forth in claim 1 wherein:
said mounting plate is removably secured to said casing,
said fitting being disposed in an aperture of said casing and being releasably connected to said casing for removal of said mounting plate, said spool, said shaft, said pointer, and said fitting from said casing as a unit.

4. The pressure gauge set forth in claim 1 wherein:
said casing at said supplemental chamber is formed to define a rearwardly directed aperture,
and including a frangible cover overlying said aperture on the exterior of said casing,
whereby in the event of rupture of said Bourdon tube from overpressure, the pressure medium exiting from said Bourdon tube is vented from said casing through said aperture.

5. The pressure gauge set forth in claim 1 wherein:
said fitting means includes connection porting communicating with said pressure cavity forming said connection means located at the bottom and back of said gauge.

6. The pressure gauge set forth in claim 5 wherein:
filter means is interposed between said cavity and said other end of said tube for filtering pressure medium exposed to said tube bore.

7. The pressure gauge set forth in claim 1 including:
an overpressure stop in said supplemental chamber for limiting the movement of said indicator in the event of overpressure and positioned for engagement by said tube in reaction to such overpressure.

8. The pressure gauge set forth in claim 1 wherein:
said casing is formed for flush mounting of said gauge,
and including a turret mounting ring in which said gauge may be mounted for surface mounting of said gauge.

9. A Bourdon tube type pressure gauge comprising:
a casing forming a housing define a relatively planar main chamber,
said casing being indented rearwardly to define a supplemental chamber of generally parallelepiped configuration,
a planar mounting plate secured to said casing over said supplemental chamber and within said main chamber, with one side of said mounting plate facing said supplemental chamber,
a tubular spool cantilever mounted on said mounting plate adjacent one end of same and extending through said mounting plate and into said supplemental chamber,
a rectilinear shaft journaled in said spool adjacent the front and rear ends of said spool and having one end of same disposed in said main chamber and the other end of same projecting from said spool within said supplemental chamber,
a multicoil small diameter Bourdon tube defining a bore extending the length thereof and encircling said spool,
with one end of said tube being sealed,
said tube being fixed to said shaft, adjacent said other end of said shaft, and adjacent said tube one end,
fitting means anchored to said mounting plate and including a gas pressure cavity,
means for connecting said pressure cavity to a source of pressure fluid,
with the other end of said tube being anchored to said fitting means with said tube bore exposed to said cavity,
a scale plate, including a zero datum, fixed to said mounting plate on the side of said mounting plate facing away from said supplemental chamber with said shaft one end extending through said scale plate,
said one end of said shaft mounting an indicator,
and means for setting said indicator on said zero datum,
said scale plate forming the face of said gauge.

10. The pressure gauge set forth in claim 9 wherein:
said casing and said main chamber are of essentially concentric round configuration, with said casing being formed from nylon.

11. The pressure gauge set forth in claim 9 wherein:
said mounting plate is removably secured to said casing,
said fitting being disposed in an aperture of said casing and being releasably connected to said casing for removal of said mounting plate, said spool, said shaft, said pointer, and said fitting from said casing as a unit.

12. The pressure gauge set forth in claim 9 wherein:
said casing at said supplemental chamber is formed to define a rearwardly directed aperture,
and including a label overlying said aperture on the exterior of said casing,
whereby in the event of rupture of said Bourdon tube from overpressure the pressure medium exiting from said Bourdon tube is vented from said casing through said aperture and said label.

13. The pressure gauge set forth in claim 9 wherein:
said fitting means includes connection porting communicating with said pressure cavity forming said connection means located at the bottom and back of said gauge.

14. The pressure gauge set forth in claim 13 wherein:
filter means is interposed between said cavity and said other end of said tube for filtering pressure medium exposed to said tube bore.

15. The pressure gauge set forth in claim 9 including:
an overpressure stop in said supplemental chamber for limiting the movement of said indicator in the event of overpressure and positioned for engagement by said tube in reaction to such overpressure.

16. The pressure gauge set forth in claim 1 including vertical walls of said supplemental chamber in close proximity to said Bourdon tube.

17. The pressure gauge set forth in claim 1 including fins extending inwardly from interior walls of said supplemental chamber to close proximity of said Bourdon tube.

18. The pressure gauge set forth in claim 9 including vertical walls of said supplemental chamber in close proximity to said Bourdon tube.

19. The pressure gauge set forth in claim 9 including fins extending inwardly from interior walls of said supplemental chamber to close proximity of said Bourdon tube.

* * * * *